Jan. 6, 1970
H. C. EASTER
3,487,623
AIR FILTRATION SYSTEM
Filed Nov. 13, 1967
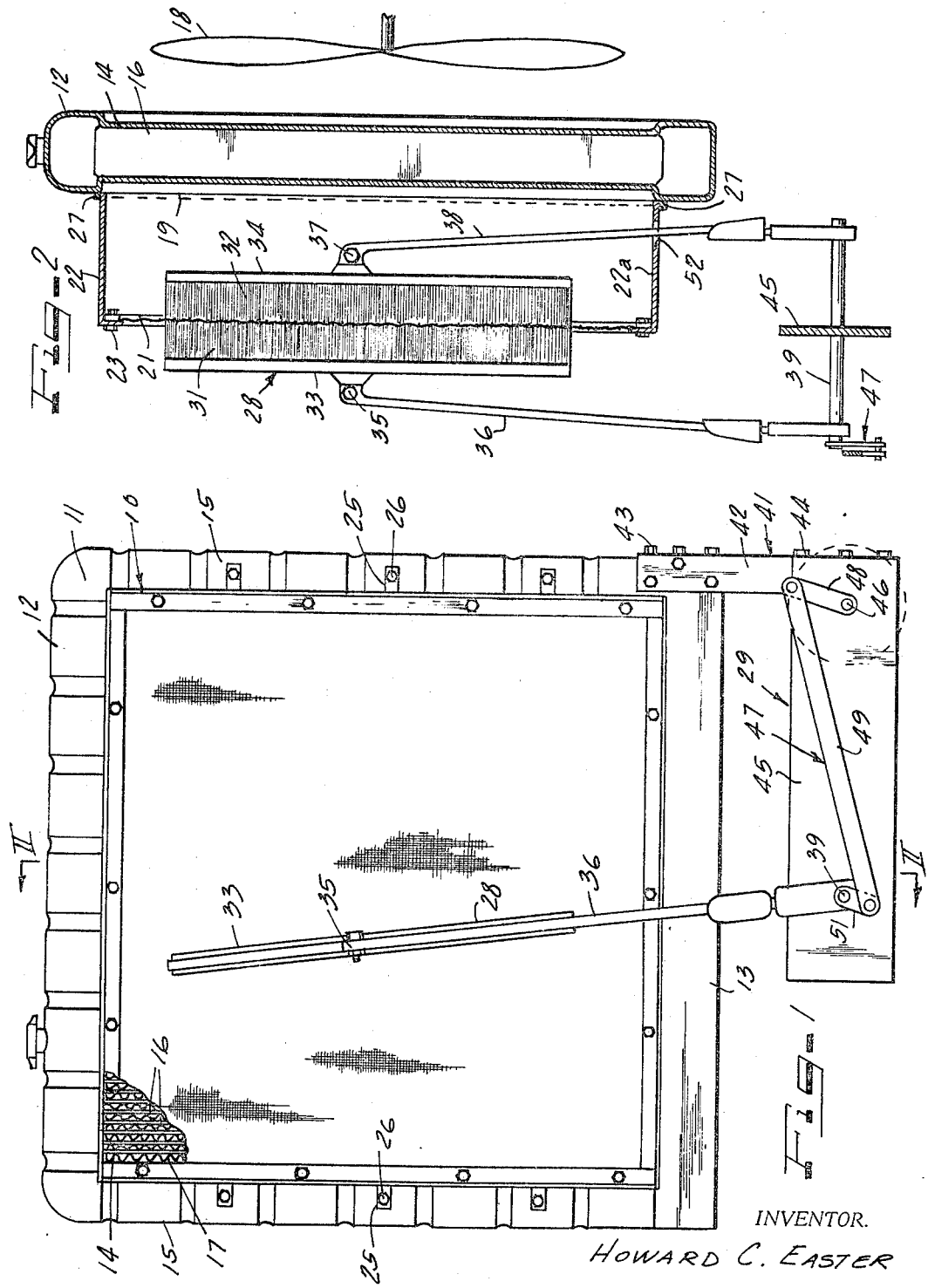
INVENTOR.
HOWARD C. EASTER
BY
ATTORNEYS

United States Patent Office 3,487,623
Patented Jan. 6, 1970

3,487,623
AIR FILTRATION SYSTEM
Howard C. Easter, Moline, Ill., assignor to The George Evans Corporation, Moline, Ill., a corporation of Illinois
Filed Nov. 13, 1967, Ser. No. 682,198
Int. Cl. B01d *33/00, 35/16*
U.S. Cl. 55—296    2 Claims

ABSTRACT OF THE DISCLOSURE

An air filtration system used with a cooling system such as a radiator and comprising a screen mounted on the suction side of the radiator for filtering out debris in the air being drawn through the radiator. A brush wiper of synthetic foam, plastic, rubber or similar material in contact with the screen and sweeping back and forth over the screen to remove the accumulation of material filtered out by the screen.

BACKGROUND OF THE INVENTION

Field of the invention

This invention pertains to a filtration device for a cooling system which filters the air passing through the cooling system.

Prior art

In a cooling system for farm machinery such as a combine, tractor or truck, a fan disposed behind the heat exchanger of the system pulls debris such as chaff, stalks, stems or leaves into the radiator to clog the air passages therein. When the passages in the radiator or heat exchanger are clogged, the engine becomes overheated and the engine must be stopped to allow the cleaning of the radiator by poking wires or sticks through the core to dislodge the debris that has accumulated therein. One solution to the above problem was the applying of a fixed screen to the suction side of the radiator. However, the screen while preventing the debris from entering the passageways of the heat exchanger becomes clogged or covered by the accumulation of the debris which destroys or hinders the proper air flow through the heat exchanger. A second solution has been the provision of a rotating screen on the suction side of the radiator. However, although the screen filters out the majority of the debris, some materials manage to pass the screen and after a period of time, such as twenty hours, the radiator passageways become clogged and must be then cleaned. Furthermore, the cleaning of such a device with rotating screen necessitates the removing of the screen which is a time consuming task.

SUMMARY OF THE INVENTION

The present invention involves positioning a screen on the suction side of a heat exchanger or radiator of a cooling system to filter out the debris in the air which is drawn through the heat exchanger and providing a brush-like member which sweeps over the surface of the screen to dislodge the accumulation of debris therefrom.

Accordingly, it is an object of the present invention to provide a filtering device for a cooling system.

Another object of the present invention is to provide a filtering device to filter foreign particles from the air being drawn through a cooling system.

A still further object of the present invention is to provide a self-cleaning filtering device for filtering the air drawn through a heat exchanger of a cooling system.

Yet another object of the present invention is to provide a self-cleaning filtering device which filters out the foreign particles in the air being drawn through a heat exchanger and increases the efficiency of the heat exchanger of a cooling system.

Many other advantages, features and additional objects of the present invention will become manifest to those versed in the art upon making reference to the detailed description and accompanying sheet of drawings in which a preferred structural embodiment incorporating the principles of the present invention is shown by way if illustrative example.

The drawings

FIG. 1 is a planned view of the filtering device of the present invention mounted on a radiator, and FIG. 2 is a section taken on line II—II of FIG. 1.

As shown on the drawings

The principles of this invention are particularly useful when embodied in a filtering device generally indicated at 10 which is mounted on a radiator 11.

The radiator 11 comprises an upper header 12 and a lower header 13 which are interconnected by a core 14 and side reinforcing members 15, 15. The core 14 is made up of a plurality of vertical tubes 16 having corrugated fin material 17 disposed between adjacent tubes to form a plurality of air passageways between the tubes and through the core 14. Disposed on one side of the radiator 12 is a fan 18 which draws air from a front or suction side 19 of the core 14 through the plurality of passageways in the core.

The filtering device 10 comprises a porous member such as a fine wire screen 21 secured in a frame 22 by a plurality of fastening means such as bolts 23. As illustrated, the wire screen 21 extends across an opening defined by the sides of the frame 22. To space the screen 21 from the front surface of side 19, the frame 22 has a substantial depth as illustrated in FIG. 2. The frame 22 is mounted on the radiator 12 by means of brackets 25 which are attached by a fastening means such as machine screws 26 to the sides 15, 15. To prevent the leakage of air between the frame 22 and the radiator 12, a sealing means 27 extends around the periphery of the frame 22 and contacts the surfaces of the radiator 12 and side members 15, 15.

The filtering device 10 includes a wiping means 28 and a drive means 29 to move the wiping means back and forth on the screen 21. The wiping means 28 has a pair of nylon brushes 31, 32 which contact the inner and outer surfaces of the screen 21. Both the brushes 31 and 32 comprise nylon bristles which are held in a metal backing 33, 34, respectively. The backings are substantially wider than the width of the bristles of the brush. The brush 31 is pivotally attached or connected at 35 to an end of an arm 36 while the brush 34 is pivotally attached at 37 to an end of an arm 38. Each of the arms 36 and 37 are attached at an end opposite to the pivotal connection 35, 37 to a shaft 39 so that both arms will move as the shaft 39 is turned or rotated.

To provide a sweeping motion to the wiping means 28, the drive means 29 is mounted on a frame means 41 attached to a bottom portion of the radiator 12. As illustrated, the frame 41 has an upright member 42 which is detachably secured to a side member 15 by fastening means such as machine screws or bolts 43. Attached to the upright member 42 by suitable fastening means such as screws or bolts 44 is a bottom support member 45 upon which the shaft 39 is journaled for rotation.

To provide the sweeping movement for the arms and the wiper means 28, the drive means 29 comprises a shaft 46 connected to a source of rotational movement which may be supplied by any conventional electric, hydraulic or vacuum motor. The shaft 46 is connected to the shaft 39 by a linkage 47 which comprises a lever 48 attached to the shaft 46 and connected by a linking member 49 to a lever 51 attached to the shaft 39. The length of the lever arms 48 and 51 are such that with each rotation of the shaft 46 the lever arm 51 passes through a segment of an arc to partially rotate or oscillate the shaft 39. The movement of the lever arm 51 causes the arms 36 and 38 to sweep the wiping means 28 through a path which is a segment of a circular arc. The linkage 47 is a standard four-bar linkage for converting a rotary motion into reciprocating or oscillating motion.

The frame 22 and a bottom frame 22a which is adjacent to the plate or frame support 45 is provided with a slot-like aperture 52 to allow the movement for the arm 38. Except for the opening 52, the frame 22 is substantially air tight with respect to the heat exchanger or radiator 12. Thus practically all of the air drawn through the radiator by the fan 18 passes through the screen 21. As the air passes through the screen 21, the debris such as chaff or leaves is filtered by the screen and accumulates on the surface of the screen. The sweeping motion of the wiper brush 31 will remove the debris that has accumulated on the surface of the screen 21. By using a pair of brushes 31 and 32, the outer brush 31 sweeps the material from the screen and the inner brush 32 tends to unclog or loosen the material which is lodged between the wire strands of the screening material. As mentioned hereinbefore, the backing members 33, 34 may be substantially wider than the width of the brush 31 and 32. By using the wide backing member, the air flow adjacent to the brush 31 is broken up and the suction on the material caused by the air flow is decreased adjacent to the brushes. Thus, the wiper 28 can sweep the material off the surfaces of the screen 21 easier than when the wide backing members are not present.

The screen 21 is made of stainless steel screening material or wire cloth of 100 x 100 mesh which allows sufficient air to flow through the screen while filtering out all of the material which would clog the passageways of the radiator core 14. A nylon brush having bristles of 1½ inches length has been found satisfactory for the brushes of the wiper means 28. The brushes of the wiper means 28 can be made of other materials such as plastics, rubber, or synthetic foam.

The utilization of the air filtering device 10 with the radiator eliminates the clogging of the radiator core and thus increases the efficiency of an existing radiator. With the increased efficiency in the cooling accomplished by a radiator, the utilization of the air filtering device 10 allows the use of a small radiator with the associated reduction in cost for the cooling system of the engine such as that in a combine.

The invention has been described as used with a cooling system. Obviously the invention could be used for the protection of any heat exchanger to filter particles from air passing through a heat exchange unit or system.

I claim as my invention:

1. A filtering device for a heat exchanger which includes a heat exchanger having a plurality of air passageways extending from a suction side for receiving an air flow through the heat exchanger, said device comprising:
   a frame having means for mounting the frame on the heat exchanger and having dimensions for surrounding the suction side of the air passageways, said frame having sides of substantial depth defining an opening spaced apart from the air passageways a substantial distance, said frame restricting the air flow to the suction side of the heat exchanger substantially through said opening;
   a porous member mounted on said frame across all portions of said opening for filtering the air flow therethrough;
   a wiping means including a pair of arms with each of said arms being mounted at one end on a common rotatable shaft on opposite sides of said porous member, each arm supporting a brush at the other end with one of the brushes engaging the outer surface of the porous member and the other brush engaging the inner surface so that both brushes sweep back and forth on the opposite surfaces of said porous member with the inner brush loosening material lodged on the outer surface of the porous member as the accumulated material is moved therefrom, each of said brushes having a backing member substantially wider than the bristles so that the backing member breaks up the air flow through the porous member adjacent the brushes to facilitate removal of the foreign material;
   drive means including a source of rotational motion and a linkage means for converting rotational motion to oscillatory movement interconnecting said arm adjacent to said one end and said source of rotational motion to oscillate said arms to oscillate the brushes back and forth across said porous member to remove foreign material accumulated thereon; and
   frame means supporting said linkage means and rotatably supporting said shaft relative to said porous member to enable each of said brushes to engage and sweep its respective surface of said porous member.

2. A filtering device according to claim 1, wherein the frame includes seal means for engaging the heat exchanger to prevent leakage of air between the frame and the heat exchanger.

References Cited

UNITED STATES PATENTS

| 877,580 | 1/1908 | Mestitz | 55—296 |
| 1,475,062 | 11/1923 | Falk | 165—98 |
| 2,671,248 | 3/1954 | Wallace | 55—296 |
| 2,823,762 | 2/1958 | Bunnell | 55—296 |
| 2,854,086 | 9/1958 | Schmidt | 180—68 |
| 2,994,434 | 8/1961 | Moseres | 210—413 |
| 3,183,647 | 5/1965 | Lang | 55—96 |
| 3,309,847 | 3/1967 | Donaldson | 55—268 |

FOREIGN PATENTS

| 614,754 | 2/1961 | Canada. |
| 856,275 | 3/1940 | France. |
| 583,445 | 12/1946 | Great Britain. |

HARRY B. THORNTON, Primary Examiner

DENNIS E. TALBERT, Jr., Assistant Examiner

U.S. Cl. X.R.

15—159; 55—383, 385, 511, 502; 74—25; 165—98, 122